US010940955B2

(12) United States Patent
Lacko et al.

(10) Patent No.: US 10,940,955 B2
(45) Date of Patent: Mar. 9, 2021

(54) ACOUSTIC PANEL WITH STRUCTURAL SEPTUM

(71) Applicant: ROHR, INC., Chula Vista, CA (US)

(72) Inventors: Anthony Lacko, San Diego, CA (US); David Edward Pierick, San Diego, CA (US); Wentaur Eugene Chien, San Diego, CA (US); Song Chiou, Irvine, CA (US)

(73) Assignee: Rohr, Inc., Chula Vista, CA (US)

( * ) Notice: Subject to any disclaimer, the term of this patent is extended or adjusted under 35 U.S.C. 154(b) by 413 days.

(21) Appl. No.: 15/822,615

(22) Filed: Nov. 27, 2017

(65) Prior Publication Data

US 2019/0161199 A1    May 30, 2019

(51) Int. Cl.
| | | |
|---|---|---|
| B64D 33/02 | (2006.01) |
| G10K 11/168 | (2006.01) |
| F02K 1/82 | (2006.01) |
| G10K 11/172 | (2006.01) |
| F02K 1/34 | (2006.01) |
| F02C 7/045 | (2006.01) |

(52) U.S. Cl.
CPC .............. *B64D 33/02* (2013.01); *B64D 33/06* (2013.01); *F02C 7/045* (2013.01); *F02K 1/827* (2013.01); *G10K 11/168* (2013.01); *G10K 11/172* (2013.01); *B64D 2033/0206* (2013.01)

(58) Field of Classification Search
CPC ..................... B64D 33/02; B64D 33/00; B64D 2033/0206; B64D 2033/0253; B64D 33/06
USPC ........................................................... 415/9
See application file for complete search history.

(56) References Cited

U.S. PATENT DOCUMENTS

| | | | |
|---|---|---|---|
| 4,235,303 A | 11/1980 | Dhoore et al. | |
| 5,336,044 A | 8/1994 | Forrester | |
| 2001/0048048 A1 | 12/2001 | Riedel et al. | |
| 2008/0135329 A1* | 6/2008 | Strunk | F02C 7/045 181/214 |
| 2008/0179448 A1* | 7/2008 | Layland | B64D 15/12 244/1 N |
| 2011/0133025 A1* | 6/2011 | Vauchel | B64D 33/02 244/1 N |
| 2012/0224949 A1* | 9/2012 | Harper | F01D 21/045 415/9 |
| 2013/0126265 A1* | 5/2013 | Sternberger | B64D 33/02 181/214 |
| 2014/0064927 A1* | 3/2014 | Binks | B64D 29/08 415/119 |
| 2015/0315972 A1 | 11/2015 | Lumbab et al. | |

FOREIGN PATENT DOCUMENTS

EP    1336739    8/2003

OTHER PUBLICATIONS

European Patent Office, European Search Report dated Apr. 26, 2019 in Application No. 18208526.6.

* cited by examiner

*Primary Examiner* — Kenneth Bomberg
*Assistant Examiner* — Jason Mikus
(74) *Attorney, Agent, or Firm* — Snell & Wilmer L.L.P.

(57) ABSTRACT

A sound attenuation device includes an acoustic panel having a first end and a second end spaced from the first end. The first end is configured for attachment to a first mount and the second end is configured for attachment to a second mount. The acoustic panel comprises a permeable skin and a septum, the septum having a length extending between the first end and the second end.

19 Claims, 5 Drawing Sheets

ACOUSTIC PANEL WITH STRUCTURAL SEPTUM

FIELD

The present disclosure relates generally to acoustic panels and, more particularly, to methods of attaching acoustic sandwich panels to aircraft engine systems.

BACKGROUND

Sandwich panels, comprising two skins bounding a core structure (such as honeycomb core), are common building blocks used in aerospace and other fields. The panels typically comprise two skin surfaces which sandwich between them at least one layer of a core material. Typically the two skins and the core may be bonded together or cured/formed together, but mechanical fastening is also used in some applications. The core ties the skins together structurally, and can form a very rigid, efficient, and lightweight structure useful in aerospace applications. The sandwich panel can be given acoustic properties by perforating one skin (typically the air washed side of the panel) with specifically sized holes. This enables the cells of the core to act like individual Helmholtz resonators that attenuate a certain tone or tones of noise generated by the engine. Furthermore, more than one layer of core, separated by an additional skin, sheet, or septum, can be used to attenuate multiple tonal frequencies. In many applications, the acoustic sandwich panel serves a structural role in addition to an acoustic role, but in some applications the structural function may be secondary to the acoustics. In aerospace applications, nacelles that house turbofan gas turbine engines may use acoustic sandwich panels to form the inner barrel of the inlet, the inner fixed structure of the thrust reverser, the translating sleeve of a translating sleeve type thrust reverser or portions of an exhaust system.

In some applications, there is a conflict between the acoustic attenuation properties for an acoustic sandwich panel and the structural and packaging considerations. For example, to attenuate increasing levels of low frequency noise from modern high-bypass-ratio turbofan engines (because fans are increasingly larger and slower turning), an acoustic sandwich panel may be used having larger cavities that are tuned to these lower frequencies. Constructing acoustic sandwich panels with increasingly larger cavities may pose difficulties for attaching the panels to the various engine components, while maintaining acceptable panel package size and weight constraints. The disclosure herein provides an acoustic panel that addresses methods of attachment that maintain acoustic properties, structural capabilities and packaging considerations.

SUMMARY

A sound attenuation device is disclosed. According to various embodiments, the device includes an acoustic panel having a first end and a second end spaced a distance from the first end, with the first end configured for attachment to a first mount and the second end configured for attachment to a second mount. The acoustic panel comprises a permeable skin and a septum, the septum having a length extending between the first end and the second end.

In various embodiments, the sound attenuation device includes a core disposed between the permeable skin and the septum along a portion of the length. The core extends within the second end of the acoustic panel. The septum includes a first end configured for attachment to the first mount and, in various embodiments, the septum includes a first end configured for attachment to the first mount using a fastener configured to extend through the first end of the septum and at least a portion of the first mount. The septum may also include a second end configured for attachment to the second mount. In various embodiments, the septum includes a second end configured for attachment to the second mount using a fastener configured to extend through the second end of the septum and at least a portion of the second mount.

In various embodiments, the sound attenuation device further includes a back skin. The back skin may have a second end configured for attachment to the second mount, where the septum and the back skin are separated by a closeout seal. The back skin may also have a second end configured for attachment to the second mount, where the second ends of the septum and the back skin are configured for attachment to the second mount using a fastener configured to extend through the second ends of the septum and the back skin and at least a portion of the second mount.

The sound attenuation device may further include a first closeout seal having a first portion configured for attachment to the second end of the back skin and a second portion configured for attachment to the second end of the septum. A second closeout seal may have a first portion configured for attachment to the second end of the septum and a second portion configured for attachment to a second end of the permeable skin. In various embodiments, the second portion of the first closeout seal, the first portion of the second closeout seal and the second end of the septum are configured for attachment to each other using a fastener. In various embodiments, the second portion of the second closeout seal and the second end of the permeable skin are configured for attachment to the second mount using a fastener configured to extend through the second portion of the second closeout seal, the second end of the permeable skin and at least a portion of the second mount.

According to various embodiments, a sound attenuation device is disclosed. The device includes an acoustic panel having a first end and a second end spaced from the first end, the first end configured for attachment to a first bulkhead and the second end configured for attachment to a second bulkhead spaced from the first bulkhead. The acoustic panel may include a permeable skin, a septum and a back skin, the septum having a length extending between the first end and the second end, and a core disposed between the permeable skin and the septum along a portion of the length. The core may extend within the second end of the acoustic panel.

In various embodiments, the permeable skin, the septum and the back skin each have a first end configured for attachment to the first bulkhead. In various embodiments, the first ends of each of the permeable skin and the septum are positioned against one another to form a layered structure proximate the first bulk head. In various embodiments, the first ends of each of the permeable skin, the septum and the back skin are positioned against one another to form a layered structure proximate the first bulk head. In various embodiments, the first ends of each of the permeable skin, the septum and the back skin are configured for attachment to the first bulkhead using a blind fastener configured to extend through the first ends of each of the permeable skin, the septum and the back skin.

According to various embodiments, a nacelle inlet for an aircraft engine is disclosed. The nacelle inlet may include an acoustic panel having a first end and a second end spaced from the first end, the first end configured for attachment to a forward bulkhead and the second end configured for attachment to an aft bulkhead spaced aft of the forward bulkhead. In various embodiments, the acoustic panel comprises a permeable skin, a septum and a back skin, the septum having a length extending between the first end and the second end of the acoustic panel, and a core disposed between the permeable skin and the septum along a portion of the length. In various embodiments, the core extends within the second end of the acoustic panel and the septum includes a first end configured for attachment to the forward bulkhead and a second end configured for attachment to the aft bulkhead.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component, though not necessarily of the same axial position. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" or "proximate" refer to a direction inward, or generally, towards the reference component.

Figure 1A:
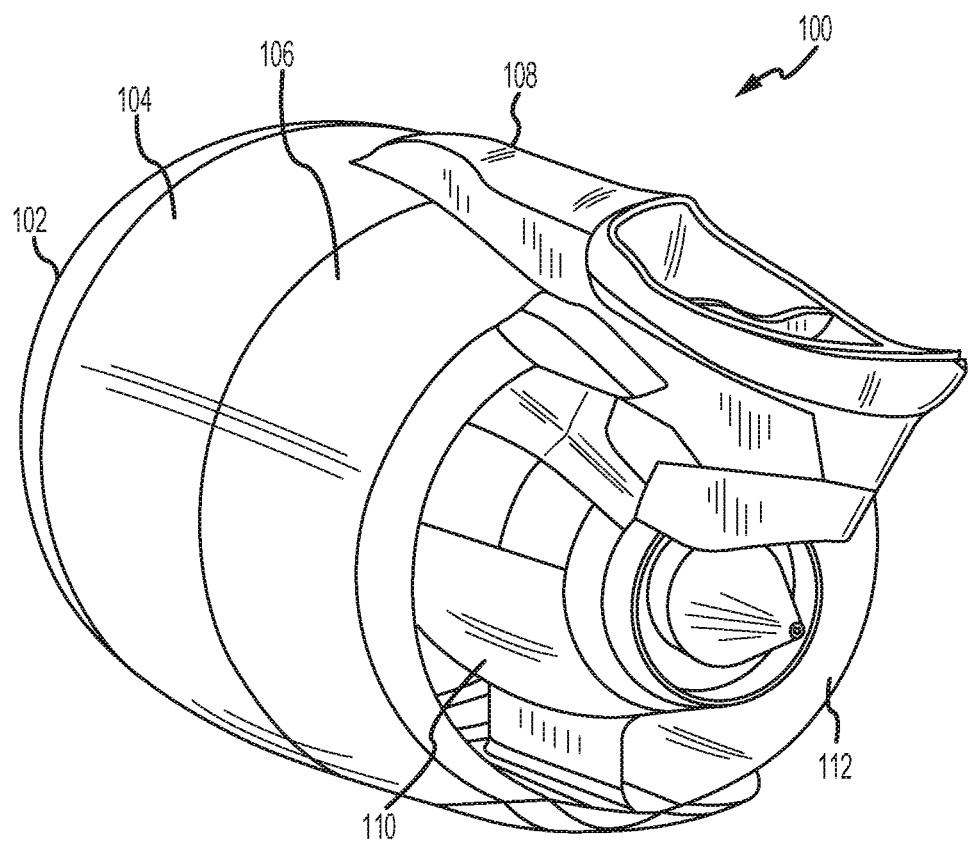
FIG. 1A is a view of a gas turbine engine, in accordance with various embodiments.

Referring to FIG. 1A, a nacelle 100 for a gas turbine engine is illustrated according to various embodiments. The nacelle 100 may comprise a nacelle inlet 102, a fan cowl 104 and a thrust reverser 106. The nacelle 100 may be coupled directly or indirectly to a pylon 108, which may be used to mount the nacelle 100 to an aircraft wing or aircraft body. The thrust reverser 106 may comprise an inner fixed structure 110 and a translating sleeve 112. Bypass air from an engine fan may flow in a generally annular bypass air duct defined between the inner fixed structure 110 and the translating sleeve 112. Portions of the nacelle inlet 102, the inner fixed structure 110 and the translating sleeve 112 may be formed using acoustic sandwich panels.

Figure 1B:
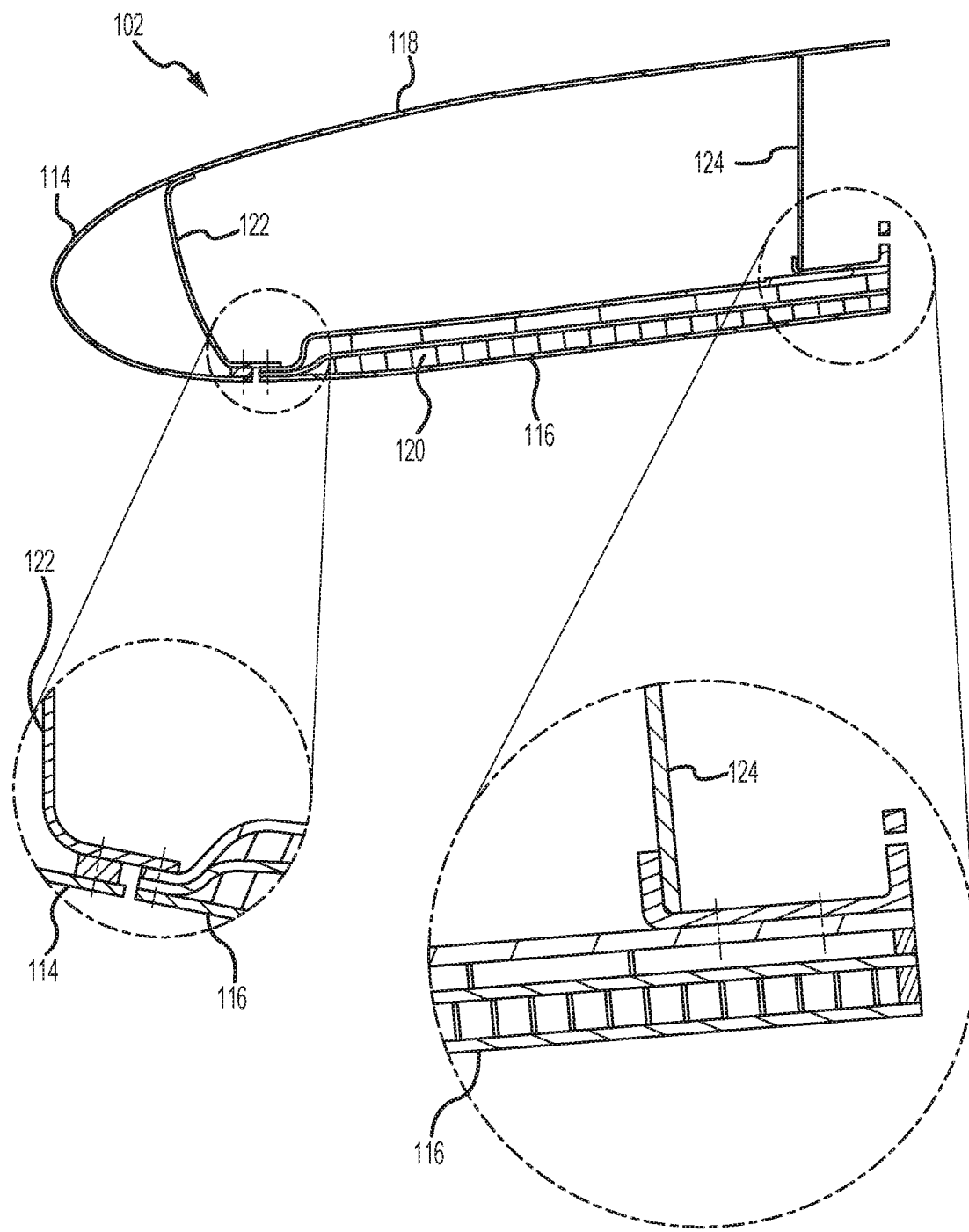
FIG. 1B is a view of a nacelle inlet of a gas turbine engine, in accordance with various embodiments.

Referring now to FIG. 1B, a cross sectional view of the nacelle inlet 102 is provided, according to various embodiments. The nacelle inlet 102 includes a lip skin 114, an inner barrel 116 and an outer barrel 118. An acoustic panel 120 is positioned at the interior of the nacelle inlet 102 and, in various embodiments, may form a part of the nacelle inlet 102. A forward bulkhead 122 extends between the inner barrel 116 and the outer barrel 118 proximate a forward end of the acoustic panel 120. An aft bulkhead 124 extends between the inner barrel 116 and the outer barrel 118 proximate an aft end of the acoustic panel 120. In various embodiments, as explained in more detail below, the acoustic panel 120 is configured to withstand loads experienced by the nacelle inlet 102 during various severe operating conditions, including fan blade out conditions, of the gas turbine engine.

Figure 2:
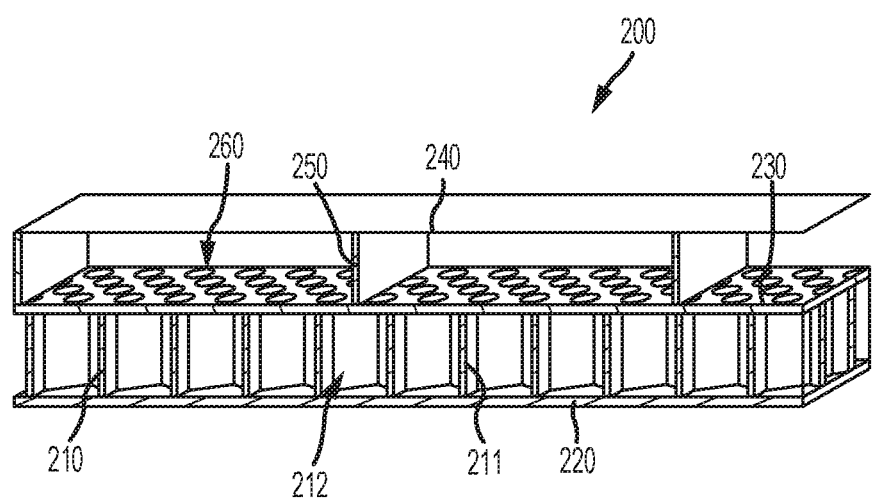
FIG. 2 is an acoustic panel, in accordance with various embodiments.

Referring now to FIG. 2, an acoustic panel 200 is illustrated according to various embodiments. The acoustic panel 200 may be used to form portions of a nacelle for an aircraft engine, as described above. The acoustic panel 200 may comprise a core 210, positioned between a permeable skin 220 and a septum 230. The core 210 may have core walls 211 extending generally in a normal direction from the permeable skin 220 to the septum 230 that form a plurality of cells 212. The cells 212 may be hexagonal in cross-sectional shape in which case the core 210 is often referred to as honeycomb core. In various embodiments, the cells 212 may have any of a number of different configurations, such as square, rectangular, circular, etc. The core walls 211 may be made from various metals, such as titanium or aluminum, or composites, or hardened paper or other plastics, according to the particular application and required material properties. The core walls 211 may be bonded to one another with adhesive or welding or other methods to form the cellular structure.

The permeable skin 220 and the septum 230 may be constructed of a metallic skin, or they may be formed of laminar plies of composites such as carbon, glass, or aramid fiber reinforcement joined together with a matrix or thermoset or thermoplastic polymer. Other types of materials, including other types of fibers and matrix materials may be used to suit a particular application. The permeable skin 220 may comprise perforations which may be round or other shapes, uniform or non-uniform. The perforations may include a microporous skin, a metal or non-metallic meshes as well as screen/film-like permeable material enclosed within the perforation, or placed as an outer surface on the permeable skin 220. Rather than a solid skin formed with distinct perforations, the permeable skin 220 may also be formed of a porous material or a mesh material or other woven material that allows sound waves to travel through it. The septum 230 may also be permeable to allow sound waves to travel through the septum 230 and into a back cavity 260 formed by a back skin 240 and a plurality of dividing walls 250. Permeability of the septum 230 may be achieved with perforations or by constructing it from a porous or mesh material, in the same manner as was described in relation to the permeable skin 220. In various embodiments, the dividing walls 250 form chambers generally larger or of different size than the cells 212 formed in the core 210.

The back skin 240 and the dividing walls 250 may comprise a non-perforated material and may be formed from a metal sheet or from laminar layers of composite material, in the same manner and with the same options as was described above in relation to the permeable skin 220 and the septum 230. A plurality of dividing walls 250 may extend between the septum 230 and the back skin 240. The septum 230, the back skin 240, and the dividing walls 250 may together form a back cavity 260 or cavities. The back cavity 260 is overlapped with and connected to the cells 212 through the septum 230 and combines to form a secondary acoustic resonating chamber or chambers. Similar to the cells 212 described above, the chambers formed by the dividing walls 250 may be of various sizes and configurations, such as hexagonal, square, rectangular, circular, etc.

Figure 3:
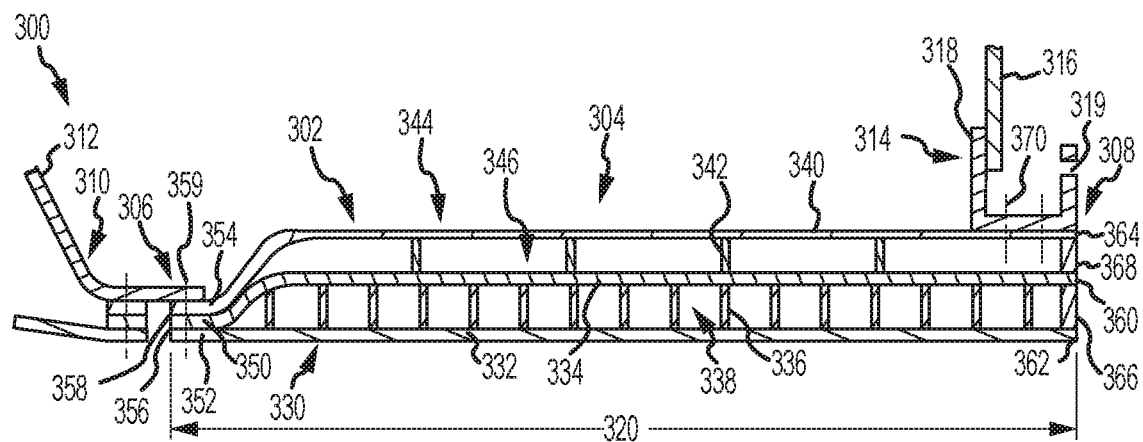
FIG. 3 is a noise attenuation device, in accordance with various embodiments, illustrating both a first end and a second end of the device.

Referring now to FIG. 3, a sound attenuation device or assembly 300 is illustrated according to various embodiments. The sound attenuation device or assembly 300 includes an acoustic panel 302 having a central portion 304, a first end or fore portion 306 and a second end or aft portion 308. The first end or fore portion 306 and the second end or aft portion 308 may, in various embodiments, define a length 320 of the acoustic panel 302. The first end or fore portion 306 is configured for attachment to a first mount 310. In various embodiments, the first mount may include a first bulkhead 312, such as the forward bulkhead 122, described above with reference to FIG. 1B. The second end or aft portion 308 is configured for attachment to a second mount 314. In various embodiments, the second mount 314 may include a second bulkhead 316, such as the aft bulkhead 124 described above with reference to FIG. 1B. In various embodiments, a flange 318 is used to couple the second end or aft portion 308 of the acoustic panel 302 to the second bulkhead 316. In various embodiments, the first mount 310 or the second mount 314 may comprise any structure, such as a flange, a bracket, a tab or the like, configured to attach one component to another. In various embodiments, the first mount 310 or the second mount 314 may comprise the actual component to which the acoustic panel 302 is to be attached. In various embodiments, the second mount 314 may be configured for attachment to a fan case ring via an aperture 319 extending through a portion of the second mount 314 or the flange 318.

Still referring to FIG. 3, the acoustic panel 302 may comprise a core 330, positioned between a permeable skin 332 and a septum 334. In various embodiments, the permeable skin 332 extends the length 320 of the acoustic panel 302. In various embodiments, the septum 334 extends the length 320 of the acoustic panel 302. The core 330 may have core walls 336 extending generally in a normal direction from the permeable skin 332 to the septum 334 that form a plurality of cells 338. In various embodiments, the core 330 extends into or within the second end or aft portion 308. In various embodiments, the acoustic panel 302 may also include a back skin 340 and a plurality of dividing walls 342 to form a back cavity 344 having a second plurality of cells 346. In various embodiments, the back skin 340 extends the length 320 of the acoustic panel 302. In various embodiments, the acoustic panel 302 shares the same or similar characteristics, including design and manners and materials of construction, described above with reference to FIG. 2.

Still referring to FIG. 3, the septum 334 is illustrated extending the length 320 of the acoustic panel 302. In various embodiments, the septum 334 has a first end 350 configured for extending into or within the first end or fore portion 306 of the acoustic panel 302. In various embodiments, the permeable skin 332 has a first end 352 and the back skin 340 has a first end 354, and one or both of the first ends are configured for extending into or within the first end or fore portion 306 of the acoustic panel 302. In various embodiments, the first end 350 of the septum 334 and the first end 352 of the permeable skin 332 have opposing face portions that may be positioned against one another to form a two-layered structure 356 proximate the first end or fore portion 306 of the acoustic panel 302. In various embodiments, the first end 350 of the septum 334, the first end 352 of the permeable skin 332 and the first end 354 of the back skin 340 have opposing face portions that may be positioned against one another to form a three-layered structure 358 proximate the first end or fore portion 306 of the acoustic panel 302. In various embodiments, the two-layered structure 356 or the three-layered structure 358 may be positioned proximate and attached or fastened to the first mount 310. In various embodiments, the first mount may comprise the first bulkhead 312. In various embodiments, the two-layered structure 356 or the three-layered structure 358 may be attached or fastened to the first mount 310 or the first bulkhead 312 using a fastener 359. In various embodiments, the fastener 359 may comprise a bolt, rivet or a blind fastener, such as a Hi-Lok™ Pin fastener manufactured by Lisi Aerospace or a Composi-Lok fastener manufactured by Monogram Aerospace Fasteners.

Still referring to FIG. 3, the septum 334 has a second end 360 configured for extending into or within the second end or aft portion 308 of the acoustic panel 302. In various embodiments, the permeable skin 332 has a second end 362 and the back skin 340 has a second end 364, and one or both of the second ends are configured for extending into or within the second end or aft portion 308 of the acoustic panel 302. In various embodiments, one or more of the second end 360 of the septum 334, the second end 362 of the permeable skin 332 and the second end 364 of the back skin 340 are configured for attachment or mounting to the second mount 314. In various embodiments, the second end 360 of the septum 334 and the second end 362 of the permeable skin 332 may be separated by a first closeout seal 366 and in various embodiments, the second end 360 of the septum 334 and the second end of 364 of the back skin 340 bay be separated by a second closeout seal 368.

In various embodiments, each of the second end 360 of the septum 334, the second end 362 of the permeable skin 332 and the second end 364 of the back skin 340 extend into or within the second end or aft portion 308 of the acoustic panel; the first closeout seal 366 is positioned between the second end 360 of the septum 334 and the second end 362 of the permeable skin 332; and the second closeout seal 368 is positioned between the second end 360 of the septum 334 and the second end 364 of the back skin 340. In various embodiments, one or more of the second end 360 of the septum 334, the second end 362 of the permeable skin 332 and the second end 364 of the back skin 340 may be attached or fastened to the second mount 314, the flange 318 or the second bulkhead 316 using a fastener 370. In various embodiments, the second end 364 of the back skin 340 is configured for mounting the second end or aft portion 308 of the acoustic panel 302 to the second mount 314, the flange 318 or the second bulkhead 316 using the fastener 370. In various embodiments, the fastener 370 may comprise a bolt, rivet or a blind fastener, such as a Hi-Lok™ Pin fastener manufactured by Lisi Aerospace or a Composi-Lok fastener manufactured by Monogram Aerospace Fasteners.

Figure 4:
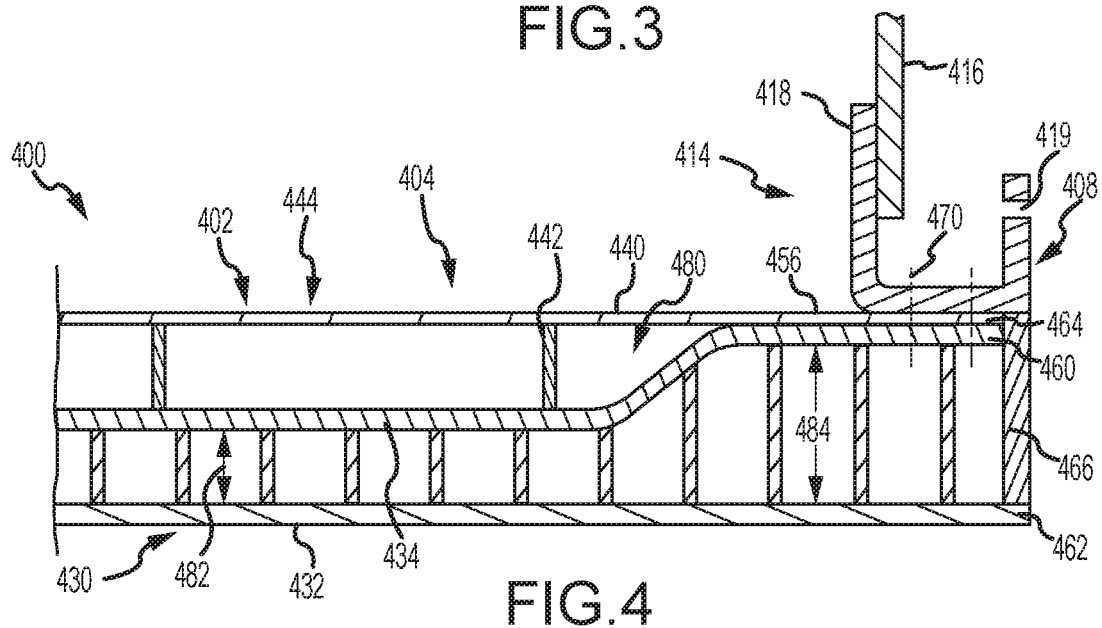
FIG. 4 is a noise attenuation device, in accordance with various embodiments, illustrating a second end of the device.

Referring now to FIGS. 4, 5, 6 and 7, second end or aft portions of several acoustic panels according to various embodiments of the disclosure are illustrated and described. In each of the various embodiments, the acoustic panel described and illustrated may include the characteristics, design, structure and mounting features of the first end or fore portion 306 of the acoustic panel 302 described above with reference to FIG. 3. Thus, only the second end or aft portion of the various embodiments is described in the disclosure that follows. Referring specifically now to FIG. 4, a sound attenuation device or assembly 400 is illustrated according to various embodiments. The sound attenuation device or assembly 400 includes an acoustic panel 402 having a central portion 404 and a second end or aft portion 408. The second end or aft portion 408 is configured for attachment to a second mount 414. In various embodiments, the second mount 414 may include a second bulkhead 416, such as the aft bulkhead 124 described above with reference to FIG. 1B. In various embodiments, the second mount 414 may comprise any structure, such as a flange, a bracket, a tab or the like, configured to attach one component to another. In various embodiments, the second mount 414 may comprise the actual component to which the acoustic panel 402 is to be attached. In various embodiments, a flange 418 is used to couple the second end or aft portion 408 of the acoustic panel 402 to the second bulkhead 416. In various embodiments, the second mount 414 may be configured for attachment to a fan casing of a gas turbine engine via an aperture 419 extending through a portion of the second mount 414 or the flange 418.

Still referring to FIG. 4, the acoustic panel 402 may comprise a core 430, positioned between a permeable skin 432 and a septum 434. In various embodiments, the septum 434 extends from a first end of the acoustic panel 402 into or within the second end or aft portion 408. In various embodiments, the permeable skin 432 extends from the first end of the acoustic panel 402 to the second end or aft portion 408. In various embodiments, the core 430 extends into or within the second end or aft portion 408. In various embodiments, the acoustic panel 402 may also include a back skin 440 and a plurality of dividing walls 442 to form a back cavity 444. In various embodiments, the back skin 440 extends from the first end of the acoustic panel 402 into or within the second end or aft portion 408. In various embodiments, the acoustic panel 402 shares the same or similar characteristics, including design and manners and materials of construction, described above with reference to FIG. 2.

Still referring to FIG. 4, the septum 434 has a second end 460 extending into or within the second end or aft portion 408 of the acoustic panel 402. In various embodiments, the permeable skin 432 has a second end 462 and the back skin 440 has a second end 464 extending into or within the second end or aft portion 408 of the acoustic panel 402. In various embodiments, the septum 434 includes a transition portion 480, where the septum transitions from a first spacing 482 with respect to the permeable skin 432 in the central portion 404 to a second spacing 484 with respect to the permeable skin 432 into or proximate the second end or aft portion 408. In various embodiments, the second spacing 484 is such that the septum 434 comes into contact with the back skin 440, forming a layered structure 456 extending into or within the second end or aft portion 408. In various embodiments, the core 430 of the acoustic panel 402 extending into or within the second end or aft portion 408 is sealed by a closeout seal 466. In various embodiments, one or more of the second end 460 of the septum 434, the second end 462 of the permeable skin 432 and the second end 464 of the back skin 440 are configured for attachment or mounting to the second mount 414, the flange 418 or the second bulkhead 416 using a fastener 470. In various embodiments, the layered structure 456 is configured for mounting the second end or aft portion 408 of the acoustic panel 402 to the second mount 414, the flange 418 or the second bulkhead 416 using the fastener 470. In various embodiments, the fastener 470 may comprise a bolt, rivet or a blind fastener, such as a Hi-Lok™ Pin fastener manufactured by Lisi Aerospace or a Composi-Lok fastener manufactured by Monogram Aerospace Fasteners.

Figure 5:
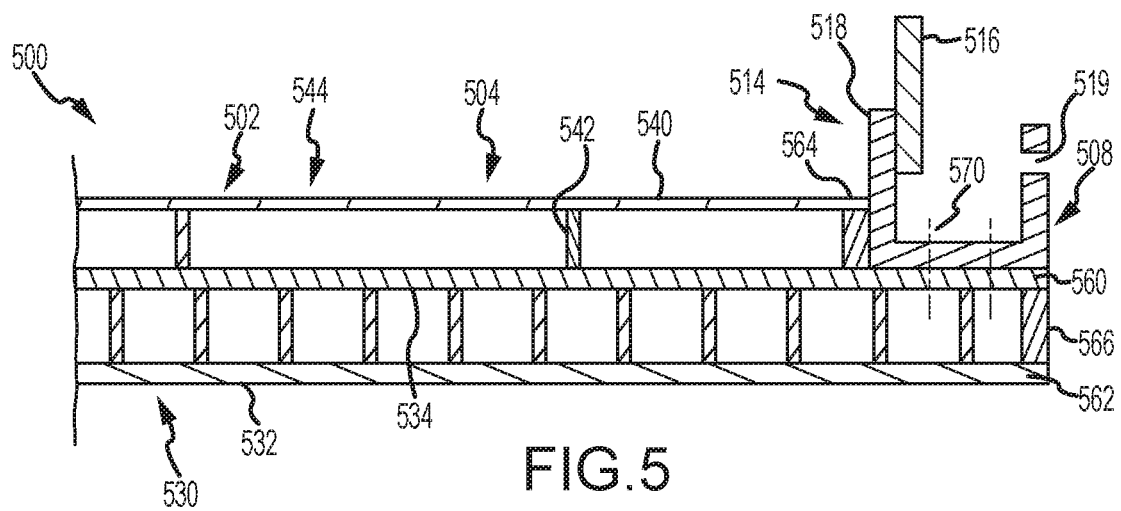
FIG. 5 is a noise attenuation device, in accordance with various embodiments, illustrating a second end of the device.

Referring now to FIG. 5, a sound attenuation device or assembly 500 is illustrated according to various embodiments. The sound attenuation device or assembly 500 includes an acoustic panel 502 having a central portion 504 and a second end or aft portion 508. The second end or aft portion 508 is configured for attachment to a second mount 514. In various embodiments, the second mount 514 may include a second bulkhead 516, such as the aft bulkhead 124 described above with reference to FIG. 1B. In various embodiments, the second mount 514 may comprise any structure, such as a flange, a bracket, a tab or the like, configured to attach one component to another. In various embodiments, the second mount 514 may comprise the actual component to which the acoustic panel 502 is to be attached. In various embodiments, a flange 518 is used to couple the second end or aft portion 508 of the acoustic panel 502 to the second bulkhead 516. In various embodiments, the second mount 514 may be configured for attachment to a fan casing of a gas turbine engine via an aperture 519 extending through a portion of the second mount 514 or the flange 518.

Still referring to FIG. 5, the acoustic panel 502 may comprise a core 530, positioned between a permeable skin 532 and a septum 534. In various embodiments, the septum 534 extends from a first end of the acoustic panel 502 into or within the second end or aft portion 508. In various embodiments, the permeable skin 532 extends from the first end of the acoustic panel 502 into or within the second end or aft portion 508. In various embodiments, the core 530 extends into or within the second end or aft portion 508. In various embodiments, the acoustic panel 502 may also include a back skin 540 and a plurality of dividing walls 542 to form a back cavity 544. In various embodiments, the back skin 540 extends from the first end of the acoustic panel 502 into or within the second end or aft portion 508. In various embodiments, the acoustic panel 502 shares the same or similar characteristics, including design and manners and materials of construction, described above with reference to FIG. 2.

Still referring to FIG. 5, the septum 534 has a second end 560 extending into or within the second end or aft portion 508 of the acoustic panel 502. In various embodiments, the permeable skin 532 has a second end 562 and the back skin 540 has a second end 564 extending into or within or proximate the second end or aft portion 508 of the acoustic panel 502. In various embodiments, the core 530 of the acoustic panel 502 is sealed by a first closeout seal 566. In various embodiments, the second end 560 of the septum 534 is configured for mounting the second end or aft portion 508 of the acoustic panel 502 to the second mount 514, the flange 518 or the second bulkhead 516 using a fastener 570 and the second end 564 of the back skin 540 terminates proximate the second end or aft portion 508 and abuts or nearly abuts the flange 518. In various embodiments, the back cavity 544 of the acoustic panel 502 terminates proximate the second end or aft portion 508 and is sealed by a second closeout seal 568 positioned adjacent the flange 518. In various embodiments, the fastener 570 may comprise a bolt, rivet or a blind fastener, such as a Hi-Lok™ Pin fastener manufactured by Lisi Aerospace or a Composi-Lok fastener manufactured by Monogram Aerospace Fasteners.

Figure 6:
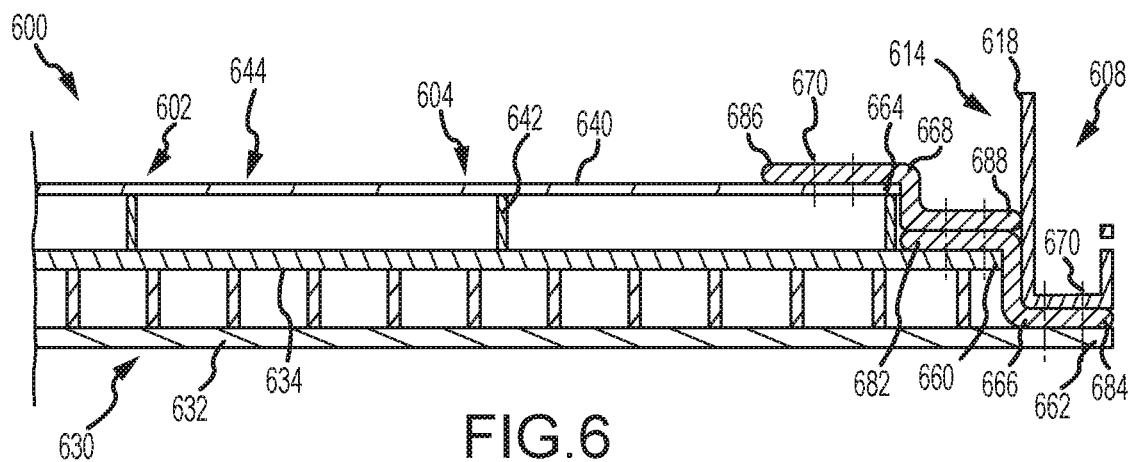
FIG. 6 is a noise attenuation device, in accordance with various embodiments, illustrating a second end of the device.

Referring now to FIG. 6, a sound attenuation device or assembly 600 is illustrated according to various embodiments. The sound attenuation device or assembly 600 includes an acoustic panel 602 having a central portion 604 and a second end or aft portion 608. The second end or aft portion 608 is configured for attachment to a second mount 614, which may include a flange 618 or other member, similar to the embodiments discussed above. The acoustic panel 602 may comprise a core 630, positioned between a permeable skin 632 and a septum 634. In various embodiments, the septum 634 extends from a first end of the acoustic panel 602 into or within the second end or aft portion 608. In various embodiments, the permeable skin 632 extends from the first end of the acoustic panel 602 into or within the second end or aft portion 608. In various embodiments, the core 630 extends into or within the second end or aft portion 608. In various embodiments, the acoustic panel 602 may also include a back skin 640 and a plurality of dividing walls 642 to form a back cavity 644. In various embodiments, the back skin 640 extends from the first end of the acoustic panel 602 into or within the second end or aft portion 608. In various embodiments, the acoustic panel 602 shares the same or similar characteristics, including design and manners and materials of construction, described above with reference to FIG. 2.

Still referring to FIG. 6, the septum 634 has a second end 660 extending into or within the second end or aft portion 608 of the acoustic panel 602. In various embodiments, the permeable skin 632 has a second end 662 and the back skin 640 has a second end 664 extending into or within or proximate the second end or aft portion 608 of the acoustic panel 602. In various embodiments, the core 630 of the acoustic panel 602 is sealed by a first closeout seal 666 that has a first portion 682 configured to engage and attach to the second end 660 of the septum 634 and a second portion 684 configured to engage and attach to the second end 662 of the permeable skin 632. In various embodiments, the first closeout seal 666 includes a step or Z-shaped configuration to maintain a constant separation between the permeable skin 632 and the septum 634. In various embodiments, the back cavity 644 of the acoustic panel 602 is sealed by a second closeout seal 668 that has a first portion 686 configured to engage and attach to the second end 664 of the back skin 640 and a second portion 688 configured to engage and attach to the second end 660 of the septum 634. In various embodiments, the second closeout seal 668 includes a step or Z-shaped configuration to maintain a constant separation between the septum 634 and the back skin 640. In various embodiments, attachment of the first closeout seal 666 to the second ends of the permeable skin 632 and the septum 634 and the second closeout seal 668 to the back skin 640 and the septum 634 is accomplished using fasteners 670. In various embodiments, the fastener 670 may comprise a bolt, rivet or a blind fastener, such as a Hi-Lok™ Pin fastener manufactured by Lisi Aerospace or a Composi-Lok fastener manufactured by Monogram Aerospace Fasteners.

Figure 7:
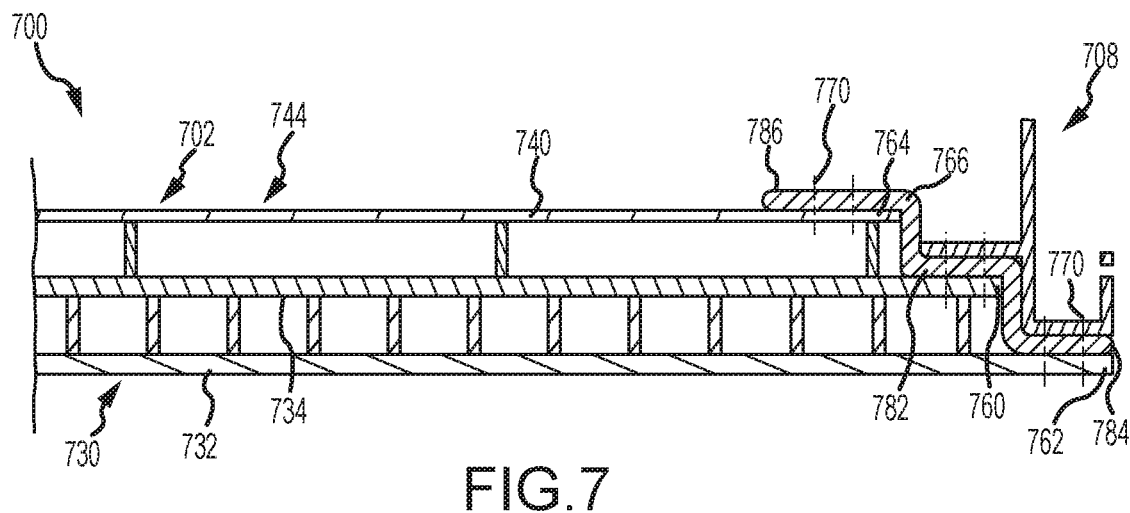
FIG. 7 is a noise attenuation device, in accordance with various embodiments, illustrating a second end of the device.

Referring now to FIG. 7, a sound attenuation device or assembly 700 is illustrated according to various embodiments. The sound attenuation device or assembly 700 includes an acoustic panel 702 having a central portion 704 and a second end or aft portion 708. The second end or aft portion 708 is configured for attachment to a second mount 714, which may include a flange 718 or other member, similar to the embodiments discussed above. The acoustic panel 702 includes a permeable skin 732, a septum 734 and a back skin 740 that form a core 730 and back cavity 744 and shares the same or a similar structure to the acoustic panel 602 described above with reference to FIG. 6. The septum 734 has a second end 760 extending into or within a second end or aft portion 708 of the acoustic panel 702. In various embodiments, the permeable skin 732 has a second end 762 and the back skin 740 has a second end 764 extending into or within or proximate the second end or aft portion 708 of the acoustic panel 702. In various embodiments, both the core 730 and the back cavity 744 of the acoustic panel 702 are sealed by a closeout seal 766 that has a first portion 782 configured to engage and attach to the second end 760 of the septum 734, a second portion 784 configured to engage and attach to the second end 762 of the permeable skin 732 and a third portion 786 configured to engage and attach to the second end 764 of the back skin 740. In various embodiments, the closeout seal 766 includes a double step or double Z-shaped configuration to maintain a constant separation between the permeable skin 732 and the septum 734 and between the septum 734 and the back skin 740. In various embodiments, attachment of the closeout seal 766 to the second ends of the permeable skin 732, the septum 734 and the back skin 740 is accomplished using fasteners 770. In various embodiments, the fastener 770 may comprise a bolt, rivet or a blind fastener, such as a Hi-Lok™ Pin fastener manufactured by Lisi Aerospace or a Composi-Lok fastener manufactured by Monogram Aerospace Fasteners.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A sound attenuation device, comprising:
   an acoustic panel having a first end and a second end spaced from the first end, the first end configured for attachment to a first mount and the second end configured for attachment to a second mount,
      wherein the acoustic panel comprises a permeable skin, a back skin and a septum, the septum having a length extending between the first end and the second end and
      wherein the first mount is configured to attach the first end of the acoustic panel to a first bulkhead of a nacelle and the second mount is configured to attach the second end of the acoustic panel to a second bulkhead of the nacelle,
   the acoustic panel further having a first closeout seal positioned between a second end of the septum and a second end of the permeable skin and a second closeout seal positioned between the second end of the septum and a second end of the back skin,
      wherein the first closeout seal has an end that terminates on a first side of the septum and the second closeout seal has an end that terminates on a second side of the septum.

2. The sound attenuation device of claim 1, further comprising a core disposed between the permeable skin and the septum along a portion of the length.

3. The sound attenuation device of claim 2, wherein the core extends within the second end of the acoustic panel.

4. The sound attenuation device of claim 3, wherein the septum includes a first end configured for attachment to the first mount.

5. The sound attenuation device of claim 3, wherein the septum includes a first end configured for attachment to the first mount using a fastener configured to extend through the first end of the septum and at least a portion of the first mount.

6. The sound attenuation device of claim 4, wherein the septum includes a second end configured for attachment to the second mount.

7. The sound attenuation device of claim 4, wherein the septum includes a second end configured for attachment to the second mount using a fastener configured to extend through the second end of the septum and at least a portion of the second mount.

8. The sound attenuation device of claim 6, wherein the back skin has a second end configured for attachment to the second mount.

9. The sound attenuation device of claim 6, wherein the back skin has a second end configured for attachment to the second mount and wherein the second ends of the septum and the back skin are configured for attachment to the second mount using a fastener configured to extend through the second ends of the septum and the back skin and at least a portion of the second mount.

10. The sound attenuation device of claim 6, wherein the first closeout seal has a first portion configured for attachment to the second end of the permeable skin and a second portion configured for attachment to the second end of the septum.

11. The sound attenuation device of claim 10, wherein the second closeout seal has a first portion configured for attachment to the second end of the septum and a second portion configured for attachment to a second end of the back skin.

12. The sound attenuation device of claim 11, wherein the second portion of the first closeout seal, the first portion of the second closeout seal and the second end of the septum are configured for attachment to each other using a fastener.

13. The sound attenuation device of claim 12, wherein the second portion of the second closeout seal and the second end of the back skin are configured for attachment to the second mount using a second fastener configured to extend through the second portion of the second closeout seal, the second end of the back skin and at least a portion of the second mount.

14. A sound attenuation device, comprising:
   an acoustic panel having a first end and a second end spaced from the first end, the first end configured for attachment to a first bulkhead of a nacelle and the second end configured for attachment to a second bulkhead of the nacelle and spaced from the first bulkhead,
      wherein the acoustic panel comprises a permeable skin, a septum and a back skin, the septum having a length extending between the first end and the second end, and a core disposed between the permeable skin and the septum along a portion of the length and
wherein the core extends within the second end of the acoustic panel,
the acoustic panel further having a first closeout seal positioned between a second end of the septum and a second end of the permeable skin and a second closeout seal positioned between the second end of the septum and a second end of the back skin,
wherein the first closeout seal has an end that terminates on a first side of the septum and the second closeout seal has an end that terminates on a second side of the septum.

15. The sound attenuation device of claim 14, wherein the permeable skin, the septum and the back skin each have a first end configured for attachment to the first bulkhead.

16. The sound attenuation device of claim 15, wherein the first ends of each of the permeable skin and the septum are positioned against one another to form a layered structure proximate the first bulkhead.

17. The sound attenuation device of claim 16, wherein the first ends of each of the permeable skin, the septum and the back skin are positioned against one another to form a layered structure proximate the first bulkhead.

18. The sound attenuation device of claim 17, wherein the first ends of each of the permeable skin, the septum and the back skin are configured for attachment to the first bulkhead using a blind fastener configured to extend through the first ends of each of the permeable skin, the septum and the back skin.

19. A nacelle inlet for an aircraft engine, comprising:
an acoustic panel having a first end and a second end spaced from the first end, the first end configured for attachment to a forward bulkhead of the nacelle inlet and the second end configured for attachment to an aft bulkhead of the nacelle inlet and spaced aft of the forward bulkhead,
wherein the acoustic panel comprises a permeable skin, a septum and a back skin, the septum having a length extending between the first end and the second end of the acoustic panel, and a core disposed between the permeable skin and the septum along a portion of the length,
wherein the core extends within the second end of the acoustic panel and
wherein the septum includes a first end configured for attachment to the forward bulkhead and a second end configured for attachment to the aft bulkhead,
the acoustic panel further having a first closeout seal positioned between a second end of the septum and a second end of the permeable skin and a second closeout seal positioned between the second end of the septum and a second end of the back skin,
wherein the first closeout seal has an end that terminates on a first side of the septum and the second closeout seal has an end that terminates on a second side of the septum.

\* \* \* \* \*